Feb. 22, 1966   T. LODE   3,236,167
UNDERWATER CAMERA
Filed Dec. 16, 1963   4 Sheets-Sheet 2
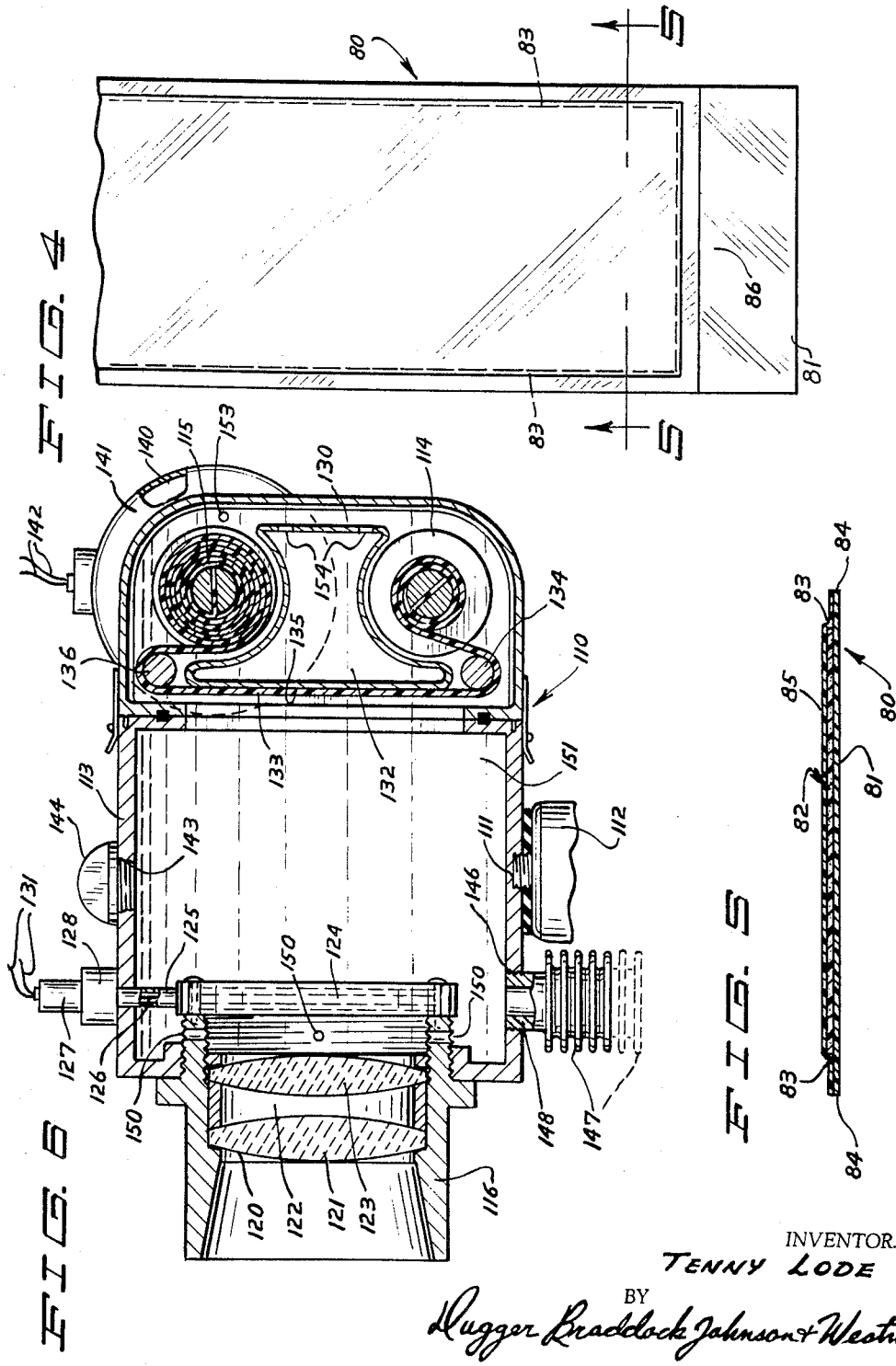
INVENTOR.
TENNY LODE
BY
Dugger, Braddock, Johnson & Westman
ATTORNEYS Feb. 22, 1966

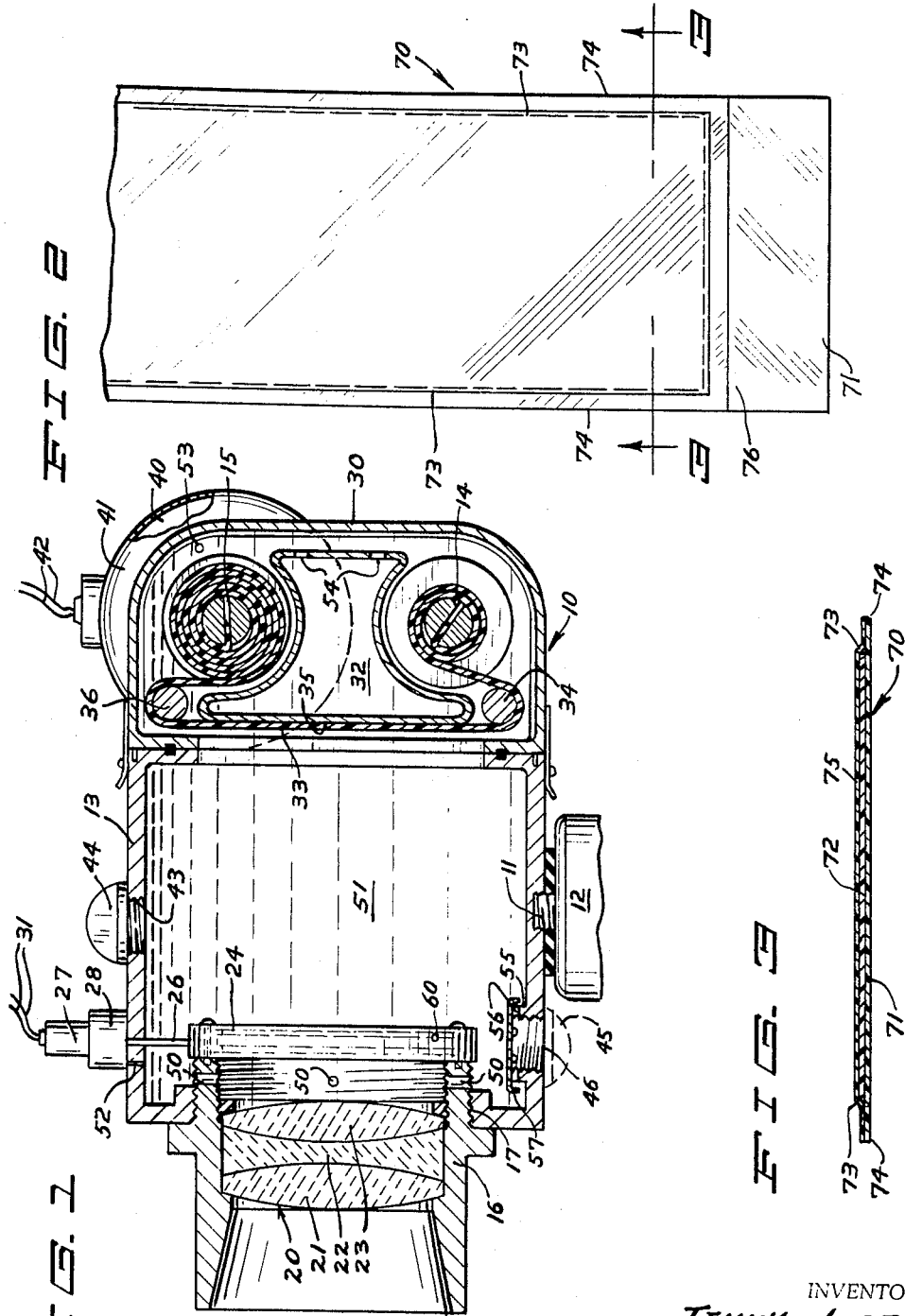

T. LODE 3,236,167

UNDERWATER CAMERA

Filed Dec. 16, 1963

INVENTOR.
TENNY LODE
BY
Dugger Braddock Johnson + Westman
ATTORNEYS

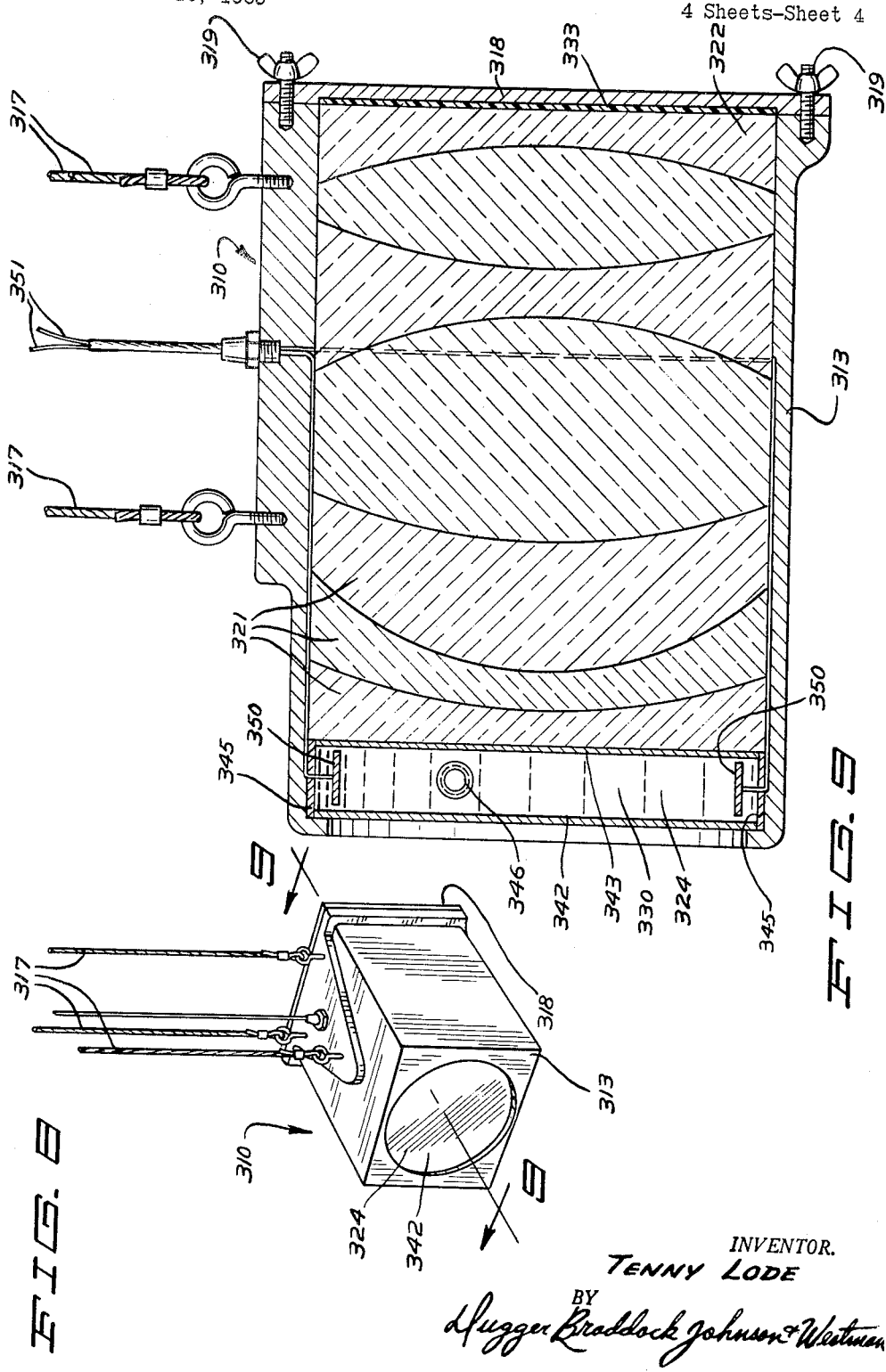

United States Patent Office 3,236,167
Patented Feb. 22, 1966

3,236,167
UNDERWATER CAMERA
Tenny Lode, Mankato, Minn., assignor to Rosemount Engineering Company, Minneapolis, Minn., a corporation of Minnesota
Filed Dec. 16, 1963, Ser. No. 330,840
2 Claims. (Cl. 95—11)

This invention has relation to cameras for use under great pressure such as they would be subjected to when used under water at great depths. In a camera made according to one form of the present invention, the camera case is filled with a substantially incompressible transparent liquid and means are provided for transmitting the external pressures due to the depth of the water to this interior liquid to equalize or substantially equalize the pressures inside and outside of the camera.

In other forms of the invention, other transparent incompressible materials, such as solids or gelatins, are positioned between light admitting means and photosensitive surfaces, thus filling entire camera cases to permit them to withstand extreme external pressures.

It is an object of the invention to provide a camera whose elements will operate when immersed in liquid so that the protective and light-tight camera case is not required to withstand the high pressures necessarily present when the camera is operated in deep water.

In order to obtain photographs under water, it has been, prior to the present invention, the recognized practice to build waterproof housings having suitable windows and to position conventional "surface" cameras therein. If the camera were to be hand held by a diver, one or more mechanical links to the outside of the waterproof housing would be provided through water-tight seals, or the housing itself would be made at least in part of a flexible material so that the normal controls could be operated through the housing. For electrically operated cameras, water-tight electrical feed through connections, such as those commonly used in hermetically sealed electrical components, would be utilized to allow the camera to be operated when inside of the housing.

Cameras embodying the features of the present invention can be operated directly by divers in depths to which divers can descend, or can be operated at such depths or at much greater depths by electrical controls which are designed to be operative when immersed in substantially incompressible liquids.

Water pressure increases at the rate of approximately one-half pound per square inch for each foot of depth. Hence, at a depth of 6,000 feet, the water pressure would be approximately 3,000 lbs. per square inch. As the operating depth and consequently the pressure increases, construction of a suitable waterproof housing for a "surface" camera becomes correspondingly difficult. Seals for controls, either electrical or mechanical, and seals for the lens assembly, for example, are exceedingly difficult to build and to maintain under these high pressures.

It has been suggested that a water-tight housing for a "surface" camera can be maintained at a pressure substantially equal to the pressure of the water at the depth it is to operate by utilizing a diving bell principle. At extreme depths, however, the amount of air or other compressible gas which would have to be introduced into the water-tight compartment or housing to establish an internal pressure equal to the external pressure would be so great as to render the principle unworkable.

In the drawings,

FIG. 1 is a vertical sectional view of a camera made according to a first form of the present invention and disclosing in section a first form of film useful in a device of the invention;

FIG. 2 is a plan view of a second form of film useful in a camera made according to the invention;

FIG. 3 is a sectional view taken on the line 3—3 of FIG. 2;

FIG. 4 is a plan view of a third form of film useful in a camera of the invention;

FIG. 5 is a sectional view taken on line 5—5 in FIG. 4;

FIG. 6 is a vertical sectional view of a camera made according to a second form of the invention embodying a number of modifications which may be incorporated into cameras made according to the invention;

FIG. 8 is a perspective view of a camera made according to a fourth form of the invention; and FIG. 9 is an enlarged vertical sectional view of the camera of FIG. 8.

Figure 7:
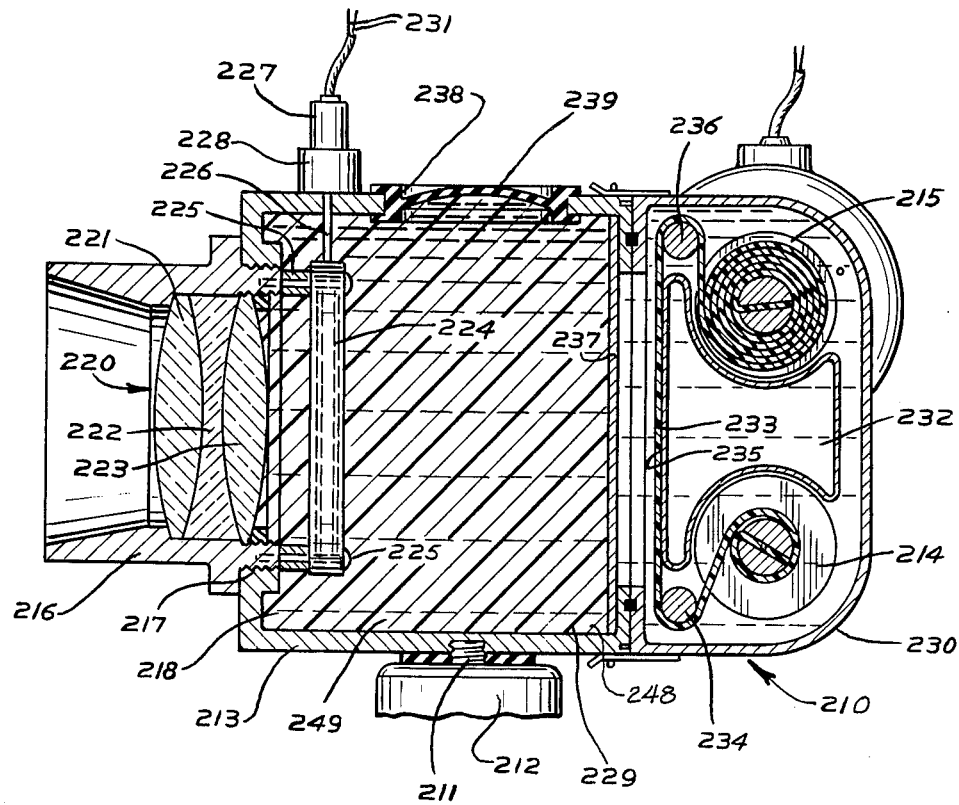
FIG. 7 is a vertical sectional view of a camera made according to a third form of the invention.

Referring now to FIG. 1 and the numerals of reference thereon, in a first form of the invention an underwater camera 10 is mounted as at 11 on a suitable base 12 which is designed to be lowered by cables or other means (not shown) into some body of water such as a sea, for example, where the camera is to be used.

The camera includes a camera case 13 in which is mounted a camera storage reel 14 and a camera takeup reel 15. A lens mount 16 is attached to the camera case 13 as at 17 and includes lens assembly 20 made up, as shown, of lenses 21, 22 and 23 of materials having different indexes of refraction. Also as shown, a shutter mechanism 24 of any usual or preferred construction is attached to the lens mount 16, and is designed to be operated by shutter control rod 26. A shutter solenoid 27 includes a solenoid covering 28 which is situated in sealing relationship to the camera case 13. Shutter control electrical leads 31, two as shown, extend outwardly from the solenoid 27 to position on the surface of the sea. The construction of the shutter solenoid 27, shutter control rod 26, and shutter mechanism 24 will be such that electrical energy supplied to shutter control electrical leads 31 will cause the shutter to operate thus permitting light rays from the image to be photographed to pass through the lens assembly 20, the shutter, and to the focal point.

In the present illustrated embodiment of the invention, it is assumed that any desired control over the amount of light entering the camera case will be exercised by controlling the shutter speed. Diaphragm mechanisms which will operate immersed in liquid are included in cameras made according to the invention where that kind of light control is needed or desired.

The focal plane of the camera of FIG. 1 is fixed by a guide member 32 mounted in a film cartridge portion 30 of the camera case 13. This guide member 32 serves as a backing for a sensitized photographic film 33 which extends from the storage reel 14, around an idler spool 34, over a plane surface 35 of the guide member 32 over an idler spool 36 and onto takeup reel 15.

A takeup reel drive motor 40 is encased in a drive motor covering 41 which is situated in sealing relationship to the cartridge portion 30 of the camera case 13. This drive motor 40 is of a type designed to operate when immersed in a liquid, and it has a pair of drive motor leads 42, 42 extending outwardly therefrom to position above the surface of the sea. The construction and arrangement of the parts will be such that each electrical impulse transmitted along the leads 42, 42 from the surface will cause the motor to advance the takeup reel 15 sufficiently to move the film by one frame.

An opening 43 in the camera case 13 is provided for use in introducing a suitable substantially incompressible liquid 51 into the camera. A plug 44 is for sealing this opening after the liquid has been introduced into the camera. A light-tight opening 46 normally permits flow of liquid into or out of the case 13; but another plug, such as indicated in dotted lines at 45, can be utilized to seal this opening 46 when the camera is being initially filled with liquid, for example.

Many liquids will be suitable for use in cameras of the invention; but in particular cameras, for example, water, alcohol or xylene will serve very well.

Photographic films presently in commerce remain light sensitive when immersed in water and are not harmed by prolonged immersion provided they are properly handled when removed from the water. Also, when immersed in liquids such as xylene, there is not even any tendency for the usual film to soften. Of course the composition of a particular film can be modified to provide the properties necessary to operate properly in a particular liquid. It is to be understood, therefore, that the film 33 can be of any usual or preferred composition which will remain light sensitive in a particular liquid 51 inside of a particular camera 10, for example, and will not unduly soften under prolonged exposure to the liquid or to the sea water which has at least limited access to the interior of the camera case 13 through the light-tight opening 46.

A plurality of holes 50 in the lens mounting 16 are provided to allow the liquid 51 to fill the space between the shutter mechanism 24 and the lens assembly 20. A hole 52 in the camera case 13 allows passage of this liquid to the inside of the solenoid covering 28, and a hole 53 is open through the camera case 13 from the interior thereof to the inside of the drive motor covering 41. Openings 54, 54 are provided in the guide 32 for free access of the liquid 51 to all surfaces of the guide. An opening 60 through the wall of the shutter mechanism 24 allows liquid 51 to replace the air in that mechanism.

A collar 55 extending inwardly from the camera case wall, openings 56 in that collar, and a baffle plate 57 in contiguous relationship with the collar effectively seal the opening 46 from any passage of light, while permitting free access of the pressures outside of the case to the interior of the camera case 13.

OPERATION

The camera is loaded with film as shown in FIG. 1 while on the surface, plug 45 is installed to block the light-tight opening 46, and plug 44 is removed. A suitable liquid 51 is then introduced into the opening 43 until all of the cavities open to the interior of the camera case 13 have been filled. One way to accomplish this is to immerse the entire camera into a bath of the liquid 51 and to manually manipulate the camera until all of the air has been expelled. An alternate way of filling the camera with liquid is to place the camera 10 in a chamber such as a bell jar, remove the air from the chamber with a vacuum pump, and fill the camera by introducing liquid into said chamber.

In connection with the filling process described, it is usually desirable to minimize the formation of bubbles. Heating the liquid to remove dissolved air, or the adding of a chemical wetting agent if water be used as the liquid are appropriate examples of techniques for minimizing said bubble formation.

When the camera has been completely filled with liquid, the plug 44 is replaced to seal the opening 43, the camera is mounted on the base 12, and the base and camera lowered to immediately below the surface of the sea or other body of water in which the camera is to be used. The plug 45 is then removed from the opening 46. Because the camera is filled with liquid, there is no substantial interchange between the sea water and the liquid 51 at position immediately below the surface of the sea water. The arrangement shown in FIG. 1 is particularly well adapted for instances in which the interior fluid 51 is lighter than the sea water or other liquid in which the camera is immersed. This will be the case, for example, when liquid 51 is fresh water and the camera is used in sea water.

The camera is lowered to its position for use, and some slight compression of the liquid 51 will result as the water pressure increases thus allowing some of the sea water to move inside of the camera. This, however, in no way affects the operation of the camera, but results in equalized pressures existing throughout the film on the storage reel and the takeup reel, between the film and the guide member 32, on both sides of the lens assembly 20, on both sides of the shutter mechanism 24 and also inside of that mechanism, and inside of the solenoid covering 28 and the motor covering 41.

Thus when the camera 10 reaches the depth at which it is to operate, and the base 12 is positioned to align the lens assembly 20 with the material to be photographed, an electrical impulse is transmitted to the shutter solenoid leads 31, 31 to cause the shutter control rod 26 to operate the shutter thus to allow exposure of the film 33. After this has happened, an electrical impulse from the surface is applied to the motor leads 42, 42 to advance the film 33 a single frame from the storage reel to the takeup reel.

When the film is used up or when all of the pictures needed have been taken, the base 12 and the camera 10 are raised from the depth to the surface of the sea. If the camera is not to be unloaded immediately, the plug 45 is reinserted to block the opening 46 before the camera is brought above the surface of the water.

The film cartridge portion 30 of the camera can be removed from the remainder of the camera case 13 under dark room conditions and while the camera is immersed in a bath of the liquid 51, and the film, now on the takeup reel 15, can be lead directly into the first developing bath without an intermediate step of drying which might cause spots or other marks upon the film. Alternatively the film can be dried after it is taken from the camera. From this point on, the film will be processed in any usual or desired manner.

While the film 33 is shown and may be described as a standard protographic film with a sensitized emulsion layer facing toward the lens assembly 20 and with a flexible backing, other forms of film can be used. For example, in FIGS. 2 and 3 there is illustrated in plan and sectional view respectively, a portion of a film strip 70 which can also be used in the camera 10 in place of the film 33. This film strip consists of a backing layer 71 which can be either opaque or transparent as desired; a layer of photosensitive film 72 is in contiguous relation to the backing layer 71, but terminates at side edges 73, 73 thereof spaced from the side edges 74, 74 of the backing layer 71. On top of the backing layer 71 and photosensitive film 72 is laid a transparent plastic layer 75 which is not adhered to or fastened in any way to the film 72, but which is joined to the backing layer 71 by heat sealing to the side edges 74, 74 and to the end edges such as 76 of the backing layer 71, thus to form a watertight envelope effectively sealing the photosensitive film 72 from direct contact with the liquid 51.

The film strip 70 operates in exactly the same way in the camera 10 as does the film 33. After the film has been exposed and removed from the camera, however, the side edges 74, 74 of the backing layer 71 and the corresponding edges of the transparent plastic layer 75 sealed thereto are trimmed off to leave the exposed sensitized film 72 ready for processing in the usual manner.

It is to be understood when the film strip 70 is used, the liquid inside of the camera 10 never comes in contact directly with the film 72 so that emulsions are selected to get the proper and desired photographic properties, and the liquid for filling the camera is chosen for its refractive index, its clarity, its availability or other desired characteristics and without regard to its possible physical or chemical action on the emulsion layer. It is important only that it does not attack the backing layer 71, the transparent plastic layer 75, or the parts of the camera inside thereof.

Yet another form of film is illustrated in FIGS. 4 and 5. In these figures, a portion of a film strip 80 is shown to include an opaque or transparent backing layer 81, a layer of photosensitive emulsion 82 deposited directly on this backing layer 81, and a clear plastic paint film 85 deposited on the upper surface of the emulsion layer 82 and the backing layer 81 as seen in FIG. 5. This plastic paint will have the characteristics that it will not affect the layer of photosensitive emulsion nor the backing layer 71 and, when dry, will be impervious to the liquid which is to be used inside of the camera. For example, if distilled water or sea water is used inside of the camera, the paint layer 85 will be such that it will not be affected by such water. This paint layer 85 will have the further property that it will dissolve quickly and easily in a solvent which will not attack the exposed sensitized emulsion layer 82. For example, it will have the property of being completely and evenly dissolved in xylene which will, in dissolving this layer, not affect the exposed emulsion layer 82, or the backing layer 81.

In order to insure that the plastic paint layer 85 completely seals the emulsion layer 82, side edges 83, 83 of the emulsion layer stop short of the side edges 84, 84 of the backing layer, and the transparent plastic paint layer 85 extends into sealing relationship with these side edges 84, 84 of the backing layer. Likewise, the transparent plastic paint layer comes into sealing relationship with an end edge 86 of the backing layer 81.

Like the film strip 70, the film strip 80 can be used directly in the camera 10 of FIG. 1.

An underwater camer 110 illustrating a second form of the invention is shown in FIG. 6 and is mounted as at 111 to a base 112 which can be supported by cables or other convenient means (not shown) for lowering the camera into the sea or other body of water in which it is to be used. The camera 110 includes a camera case 113 which is normally liquid-tight and light-tight. A camera storage reel 114 and a camera takeup reel 115 are mounted in the case 113 as is a lens mount 116. A lens assembly 120, as shown, includes a first concave lens 121 and a second concave lens 123 sealingly associated with respect to the lens mount 116 to provide a convex air cavity 122 therebetween. Although a simple sealing relationship between these parts is shown, it is to be understood that a highly precise and effective sealing mechanism will be needed and used when the camera is designed for use at extreme depths.

A shutter mechanism 124 is supported on the lens mount 116 and is constituted as a completely enclosed and sealed unit filled with air. A shutter control rod 126 extends from position inside of the shutter mechanism to position inside of a shutter solenoid 127 which is surrounded by a liquid-tight solenoid covering 128. A control rod casing 125 is also of liquid-tight construction and is situated in sealing relationship to solenoid covering 128 and to the interior of shutter mechanism 124. A pair of shutter control electrical leads 131, 131 are hermetically sealed with respect to the solenoid covering 128 and extend outwardly from the solenoid 127 to the surface of the sea.

A guide member 132 is situated in a film cartridge portion 130 of the camera case 113. A sensitized photographic film 133 extends from position on the storage reel 114, around idler spool 134, across a plane surface 135 of the guide member 132, around idler spool 136, and onto the takeup reel 115.

A takeup reel drive motor 140 is mounted on the camera case film cartridge 130 inside of a drive motor covering 141, and drive motor leads 142, 142 extend outwardly from the covering 141 and motor 140 to the surface of the sea.

A filler plug opening 143 is provided in the camera case 113, and a plug 144 is provided to normally close that opening. A light-tight opening 146 is provided in the camera case 113 and a bellows 147 has a conduit 148 situated in the light-tight opening 146.

A plurality of holes 150 in the lens mount 116 between the second concave lens 123 and the shutter mechanism 124 allow for free access of a suitable substantially incompressible liquid 151 inside of the camera case 113. An opening 153 is provided through the film cartridge portion 130 of the camera case 113 into the drive motor covering 141, and the drive motor 140 is of a type capable of operation when immersed in a suitable liquid. Openings 154, 154 are provided in the guide member 132.

OPERATION

In order to make the underwater camera 110 ready for use, the film 133 is situated on the storage reel 114 and positioned as shown in FIG. 6 connected to the takeup reel 115. The plug 144 is removed, and a suitable liquid 151 is introduced into the camera case 113 through the opening 143. This is conveniently done by immersing the entire camera case in a bath of the liquid 151 and manually rotating the camera to allow pockets of air to escape, or can be done by other filling methods such as described previously. When the camera case has been completely filled, the plug 144 is repositioned to close the opening 143. When the camera 110 is subjected to pressure close to atmospheric the bellows 147 expands to a maximum volume, as indicated by the dotted lines.

With the camera completely filled with a suitable liquid, it is attached to the base 112, and lowered beneath the surface of the sea to position where it is to be used.

As the camera is lowered into its working position, the pressure from the sea water outside is transmitted through the instrumentality of the bellows 147 to the liquid inside. Thus the pressures between the inside liquid and the sea water outside the camera are substantially equal and no stress or strain is put on any of the camera parts.

When positioned for use, electrical impulses to the lines 131, 131 cause the shutter to operate, and electrical impulses to the leads 142, 142 cause the drive motor 141 to advance the film 133 frame by frame as needed.

When the camera has been used to exposed the film 133, it is brought to the surface and immersed in a bath of the liquid 151, or the liquid can be drained out of the camera through the opening 143 after the plug 144 is removed. Handling of the film 133 is accomplished in the same manner as explained in connection with the underwater camera 10 of FIG. 1.

Film 133 can be identical in nature to film 33 or can be the same as film strip 70 or film strip 80.

In a third form of the invention as illustrated in FIG. 7, an underwater camera 210 is mounted as at 211 on a suitable base 212 which is designed to be lowered by cables or other means (not shown) into the sea or other body of water where the camera is to be used.

The camera includes a camera case 213 in which is mounted a camera storage reel 214 and a camera takeup reel 215. A lens mount 216 is attached to the camera case 213 as at 217 and includes a lens assembly 220 made up, as shown, of lenses 221, 222 and 223 of materials having different indexes of refraction. Also as shown, a shutter mechanism 224 of any usual or preferred construction is attached to the lens mount 216 by a plurality of mounting posts 225. A shutter solenoid 227 includes a solenoid covering 228 which is situated in sealing relationship to the camera case 213. Shutter control electrical leads 231, two as shown, extend upwardly from the solenoid 227 to position on the surface of the sea. The construction of the shutter solenoid 227, shutter control rod 226, and shutter mechanism 224 will be such that electrical energy supplied to the shutter control electrical leads 231 will cause the shutter to operate thus permitting light rays from the image to be photographed to pass through the lens assembly 220, the shutter, and to the focal plane.

The elements of the camera of the third form of the invention as shown in FIG. 7 and thus far enumerated are substantially identical in form and operation with the corresponding elements of the first form of the invention as illustrated in FIG. 1. However, the shutter mechanism 224 and the shutter solenoid 227 will be of the hermetically sealed type such as the corresponding shutter mechanism 124 and solenoid 127 described in connection with FIG. 6 and the second form of the invention. A film cartridge portion 230 of camera case 213 will be identical with the camera cartridge portion 30 of the camera case 13 of the first form of the invention, and any of the film which can be used in connection with the first form of the invention can be used in connection with the third form now being described. A film 233 is shown extending over a guide member surface 235 of a guide member 232 and over idler spools 234 and 236.

In the form of the invention disclosed in FIG. 7, a transparent retainer plate 237 is mounted inside of a forward portion 229 of the camera case 213 to separate the interior of the forward portion from the film cartridge portion 230. A relatively large diaphragm opening 238 is sealed by an opaque, flexible diaphragm 239 to provide an air-tight and liquid-tight cavity 248 in the forward portion of the camera case 213. As shown, a transparent, gelatinous relatively incompressible material 249 completely fills this cavity. One satisfactory method of introducing such a material is to put it into the cavity in a liquid form through the diaphragm opening 238, inserting the diaphragm in such a manner that no air is entrapped between the gelatinous material 249 and the diaphragm, and then allowing the material to set.

OPERATION

Basically the camera 210 will operate the same as the camera 10. When the camera is lowered to extreme depth or otherwise subjected to extreme pressures, these pressures will be transmitted to the gelatinous material inside of the forward portion 229 of the camera through the instrumentality of the diaphragm 239.

In the fourth form of the invention as shown in FIGS. 8 and 9, an underwater camera 310 includes a camera case 313, a plurality of lenses 321 of solid materials located within that case, a sensitized photographic film 333 at the back of the case in contiguous relationship to the final lens 322, and a camera case cover 318 bolted to the back of the camera case 313 as at 319 to be in contiguous relationship to the film.

A three cable harness indicated generally at 317 is for the purpose of lowering the camera to the depth desired and for controlling the camera attitude and direction at that depth.

In the fourth form of the invention as shown, an electro-optical shutter 324 employing the Kerr cell principle is illustrated. In this shutter, a polarizer 342 is in front of and spaced from an analyzer 343, and a liquid 330 such as nitrobenzene is interposed therebetween. A sealing ring 345 is provided to hermetically seal the polarizer and analyzer in spaced relation to each other to form a liquid-tight chamber for the liquid 330 which chamber can withstand a certain amount of pressure. If desired, a diaphragm 346 extending through the sealing ring 345 and through the side of the camera case 313 is provided as shown so that pressures outside of the camera are transmitted to the liquid 330 inside thereof.

In accordance with the operation of a Kerr cell, condenser plates 350 are connected by electrical leads 351 extending to the surface of the sea. When an electrical impulse is impressed across the plates 350, light will pass through the polarizer 342, the liquid 330 and the analyzer 343, through the various lenses 321 and will impinge upon the photographic film 333. The camera 310 is then raised to the surface by means of the harness 337, and the film removed and processed in the usual manner.

While a roll-type "still" camera and a single exposure camera have been illustrated and described, it is to be understood that the principle of the invention would work equally well in connection with a movie camera or any other camera where the light-tight portion thereof is maintained at approximately the same pressure as the water in which it is operated, or is maintained at a slight pressure differential with respect to the water in which it is operating, through the instrumentality of a relatively incompressible transparent material in the light-tight portion of the camera between the photosensitive material and the light admitting opening.

While the presence of a relatively incompressible transparent material between the light emitting portion of the camera and the photosensitive surface is an essential element of the invention, it is to be understood that individual elements of the invention can consist of transparent compressible materials. For example, as shown in FIG. 6, the concave lens portion 122 and the hermetically sealed shutter mechanism 124 include air or other gas; and a diaphragm mechanism, a motor drive mechanism and other elements, if used in an underwater camera, could likewise be sealed in air-tight containers.

What is claimed is:

1. An underwater camera comprising a light-tight camera case, a photosensitive surface inside of said case, means for admitting light into said case to impinge on said photosensitive surface, a relatively incompressible transparent liquid in said case between said light admitting means and said surface, and a light-tight passageway for said liquid being provided through a wall of said case.

2. The combination as specified in claim 1 wherein said light-tight passageway is covered with a flexible member in sealing relationship to the passageway.

References Cited by the Examiner

UNITED STATES PATENTS

| | | | |
|---|---|---|---|
| 2,295,802 | 9/1942 | Nicoll | 88—57 X |
| 2,862,428 | 12/1958 | Salter | 95—11 |
| 2,901,143 | 8/1959 | Pope. | |
| 2,968,228 | 1/1961 | Merritt | 95—11 |

OTHER REFERENCES

Journal of the Society of Motion Picture and Television Engineers, July 1955, vol. No. 64, issue No. 7, page 345.

JOHN M. HORAN, *Primary Examiner.*